United States Patent
Huang

[11] Patent Number: 6,073,642
[45] Date of Patent: Jun. 13, 2000

[54] CONNECTOR ASSEMBLY FOR AN UPRIGHT SHAFT OF A BEACH UMBRELLA

[76] Inventor: Jung-Chang Huang, No. 31, Alley 31, Lane 540, Yuang-Fang Rd., Chang-Hua City, Taiwan

[21] Appl. No.: 09/189,753

[22] Filed: Nov. 10, 1998

[51] Int. Cl.[7] ................................. A45B 9/00; F16B 7/18
[52] U.S. Cl. ................ 135/114; 135/15.1; 135/99; 135/120.3; 52/726.3; 403/296; 403/305; 248/511
[58] Field of Search .................... 135/114, 120.3, 135/98, 99, 15.1; 52/726.1, 726.3, 726.4, 736.1; 403/292, 296, 298, 305; 248/511

[56] References Cited

U.S. PATENT DOCUMENTS

| | | | |
|---|---|---|---|
| 1,576,677 | 3/1926 | Scheibeler | 403/305 |
| 3,355,998 | 12/1967 | Roemisch | 52/726.3 X |
| 3,359,449 | 12/1967 | Trask | 403/296 X |
| 4,156,793 | 5/1979 | Carlson | 403/305 X |
| 5,059,057 | 10/1991 | Graef | 403/298 |
| 5,152,118 | 10/1992 | Lancelot | 52/726.1 |
| 5,411,347 | 5/1995 | Bowmer et al. | 52/726.1 X |

*Primary Examiner*—Robert Canfield
*Attorney, Agent, or Firm*—Ladas & Parry

[57] ABSTRACT

A connector assembly for an upright shaft of a beach umbrella, includes first and second stem members and a tubular connecting member. The upright shaft portion includes a lower shaft portion and a hollow upper shaft portion. The lower shaft portion extends in an axial direction and is provided with an upwardly opened annular end portion. The upwardly opened annular end portion has a first inner annular wall with a first dimension. The upper shaft portion is provided with a downwardly opened annular end portion which can brought in the axial direction to connect with the upwardly opened annular end portion. The downwardly opened annular end portion has a second inner annular wall with a second dimension. The first and second stem members have first lower and upper stem portions press-fitted into the upwardly and downwardly opened end portions of the lower and upper shaft portions. The tubular connecting member has upper and lower threaded inner circumferential walls to engage threadedly first and second threaded outer circumferences of the first and second stem members.

2 Claims, 5 Drawing Sheets

6,073,642

CONNECTOR ASSEMBLY FOR AN UPRIGHT SHAFT OF A BEACH UMBRELLA

BACKGROUND OF THE INVENTION

1. Field of the Invention

The invention relates to a connector assembly, more particularly to a connector assembly for an upright shaft of a beach umbrella.

2. Description of the Related Art

Referring to FIGS. 1 and 2, a conventional connector assembly 1 is used for connecting a lower shaft portion and a hollow upper shaft portion of an upright shaft of a beach umbrella. The lower shaft portion 12 extends in an axial direction and is adapted to be secured to a support (not shown) The lower shaft portion 12 has an upwardly opened annular end portion 121, and a radial hole 122 formed therethrough. The upper shaft portion 11 is adapted to carry a stretchable canopy (not shown) thereon, and has a downwardly opened annular end portion 112 and a radial hole 111 formed therethrough. The conventional connector assembly 1 includes a resilient leaf spring 123 with two opposite ends 124, and an engagement tongue fixed thereon proximate to one end thereof. An intermediate portion of the leaf spring 123 is pressed downward relative to the lower shaft portion 12 in such a manner that the opposite ends 124 of the leaf spring 123 are inserted into and frictionally engage an inner surface of the upwardly opened annular end portion 121 while the engagement tongue 125 protrudes outwardly of the radial hole 122. The downwardly opened annular end portion 112 of the upper shaft portion 11 defines an inner circumferential wall of a dimension slightly larger than an outer circumference of the upwardly opened annular end portion 121 of the lower shaft portion 12 so that the upper shaft portion 11 can be brought in the axial direction to connect with the lower shaft portion 12 in such a manner that the engagement tongue 125 also protrudes outwardly of the radial hole 111, thereby preventing disengagement in the axial direction.

A disadvantage of the conventional connector assembly resides in that, since the upper and lower shaft portions are connected to each other solely by the engagement tongue, wobbling of the upper and lower shaft portions relative to each other may occur in the event of a strong wind.

SUMMARY OF THE INVENTION

Therefore, the object of this invention is to provide a connector assembly for an upright shaft of a beach umbrella which is clear of the aforesaid disadvantage resulting from the use of the conventional connector assembly.

Accordingly, a connector assembly of this invention is adapted for use in an upright shaft of a beach umbrella which includes a lower shaft portion and a hollow upper shaft portion. The lower shaft portion extends in an axial direction and is adapted to be secured to a support. The lower shaft portion is provided with an upwardly opened annular end portion that has a first inner annular wall with a first dimension. The upper shaft portion is adapted to carry a stretchable canopy and is provided with a downwardly opened annular end portion which can brought in the axial direction to connect with the upwardly opened annular end portion. The downwardly opened annular end portion has a second inner annular wall with a second dimension. The connector assembly includes a first stem member having a first lower stem portion with a first outer circumference of a third dimension which is slightly larger than the first dimension so that the first lower stem portion will be adapted to engage firmly the first inner annular wall once the first lower stem portion is inserted into the upwardly opened annular end portion along the axial direction, and a first upper stem portion. The first upper stem portion has a first threaded outer circumference. A second stem member has a second lower stem portion with a second threaded outer circumference, and a second upper stem portion with a second outer circumference of a fourth dimension which is slightly larger than the second dimension so that the second upper stem portion will be adapted to engage firmly the second inner annular wall once the second upper stem portion is inserted into the downwardly opened annular end portion along the axial direction. A tubular connecting member has an upper threaded inner circumferential wall disposed to engage threadedly the second threaded outer circumference, and a lower threaded inner circumferential wall disposed to engage threadedly the first threaded outer circumference.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
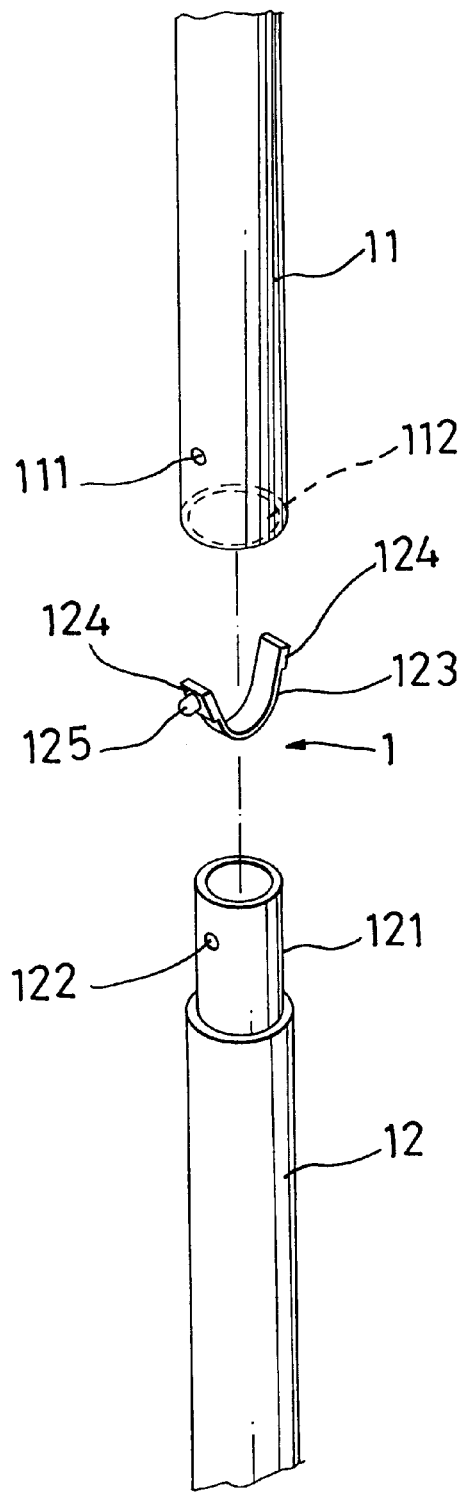
FIG. 1 is a perspective view of a conventional connector assembly for connecting upper and lower shaft portions of an upright shaft of a beach umbrella.
Figure 2:
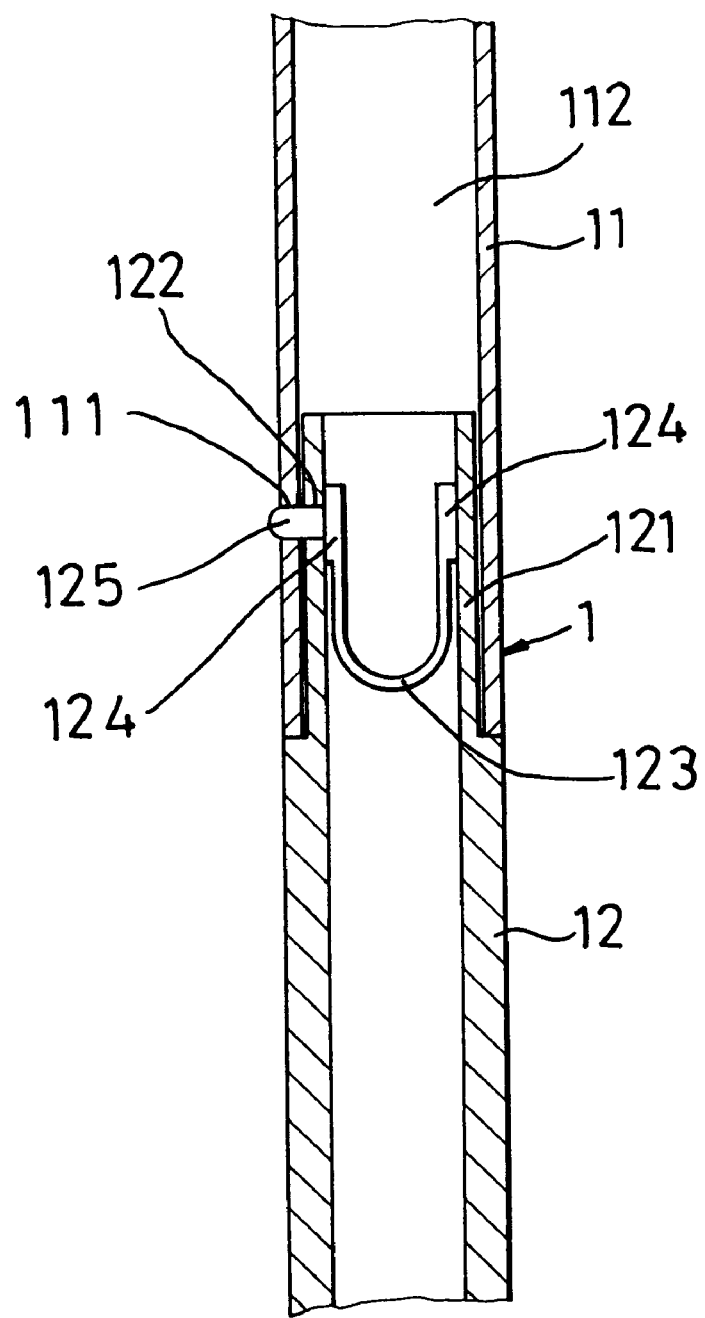
FIG. 2 is a fragmentary sectional view of the upright shaft connected by the conventional connector assembly.
Figure 3:
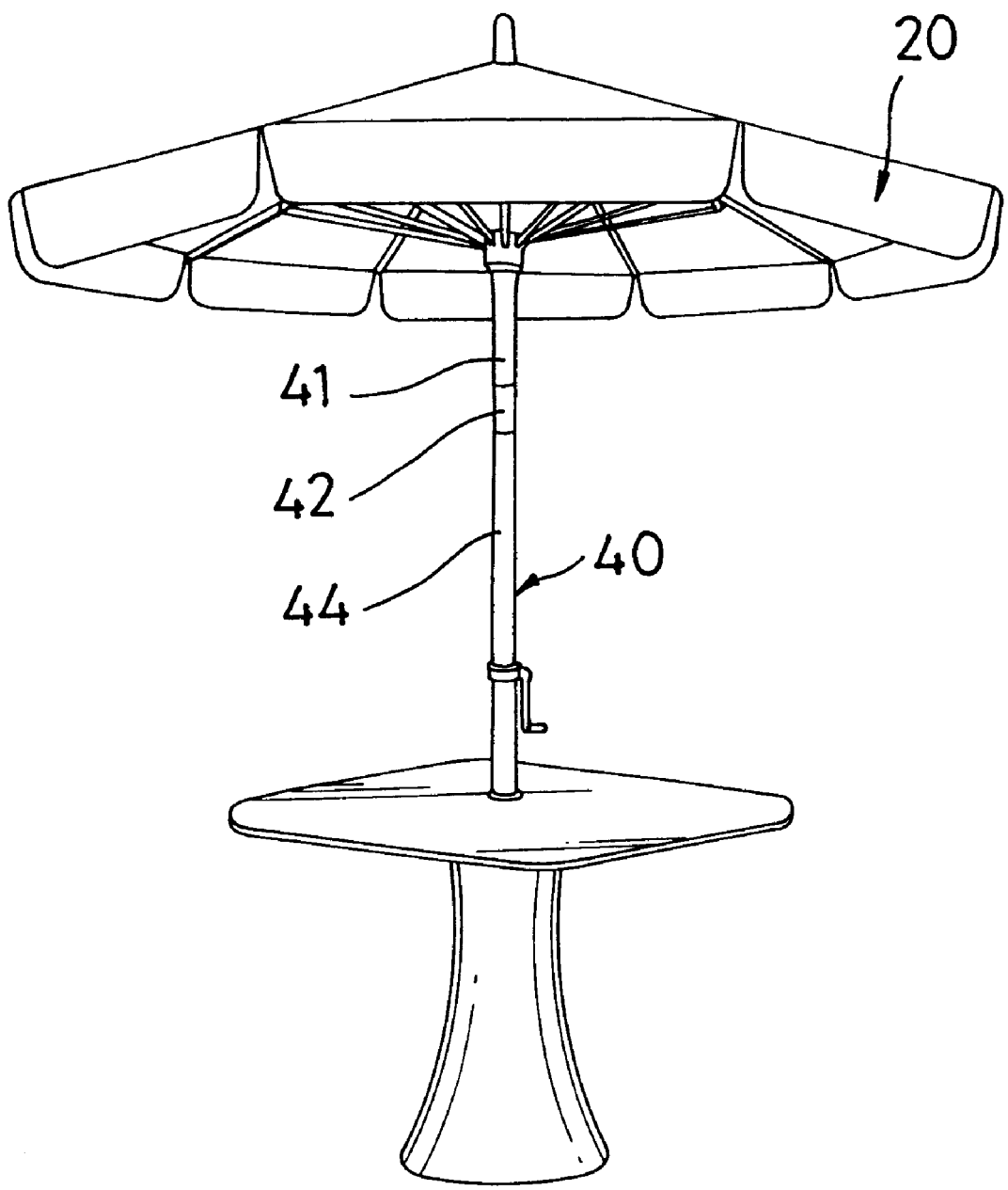
FIG. 3 is a perspective view of a beach umbrella which has an upright shaft connected by a connector assembly of this invention.
Figure 4:
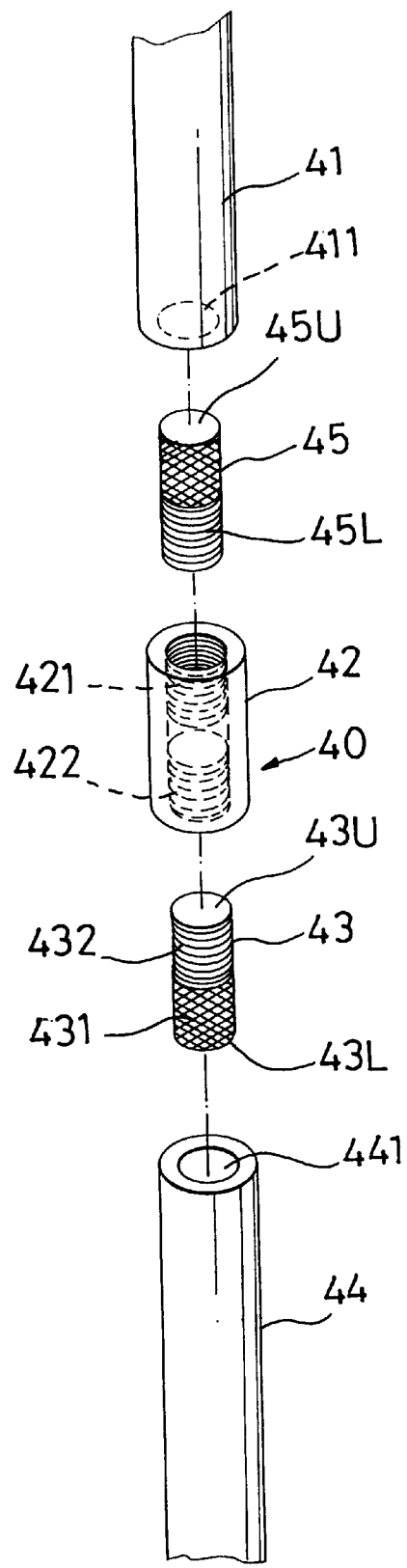
FIG. 4 illustrates how the connector assembly of this invention connects upper and lower shaft portions of the upright shaft shown in FIG. 3.
Figure 5:
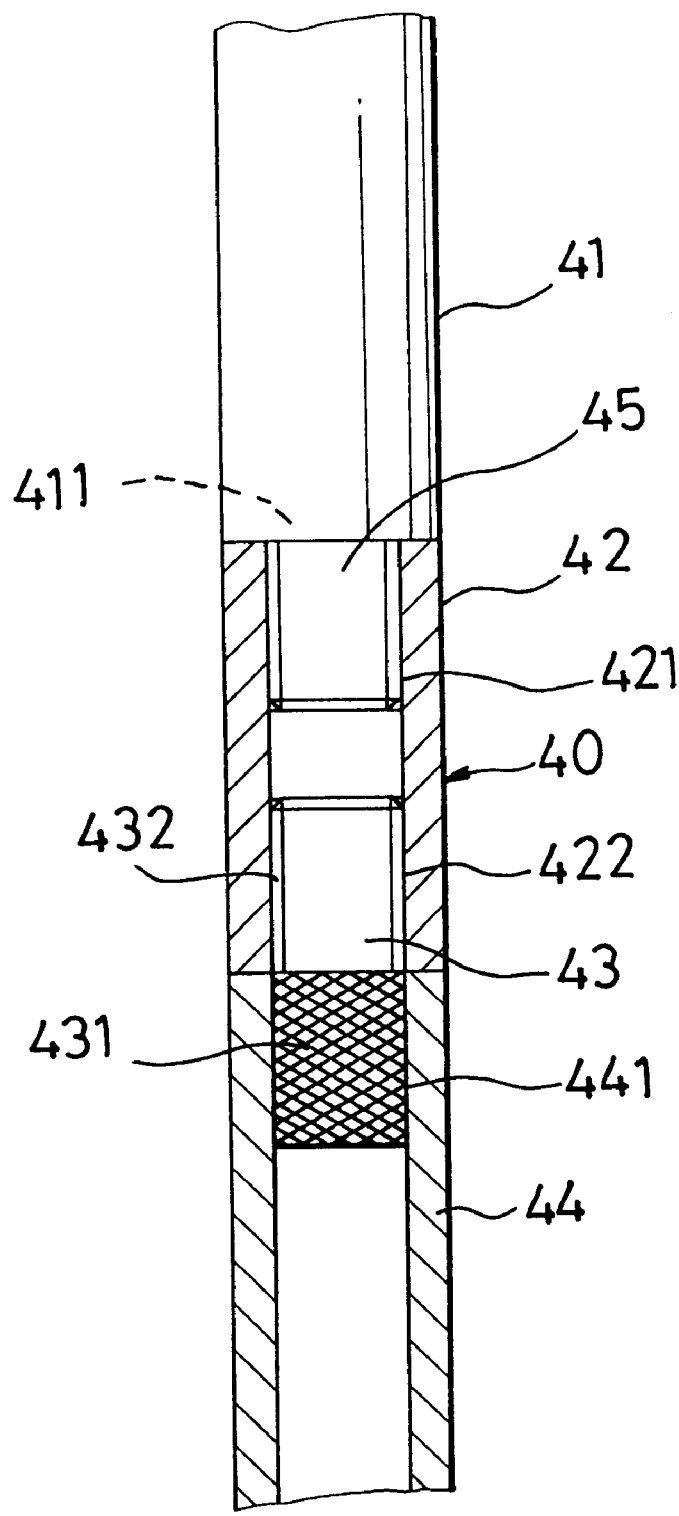
FIG. 5 is a fragmentary sectional view of the upright shaft connected by the connector assembly of this invention.

Referring to FIGS. 3, 4 and 5, the preferred embodiment of a connector assembly according to this invention is shown to be applied to an upright shaft 40 of a beach umbrella which includes a lower shaft portion 44 that extends in an axial direction and that is adapted to be secured to a support, and an upper shaft portion 41. The lower shaft portion 44 has an upwardly opened annular end portion 441 with a first inner annular wall of a first dimension. The upper hollow shaft portion 41 is adapted to carry a stretchable canopy 20 (see FIG. 3) and is provided with a downwardly opened annular end portion 411. The downwardly opened annular end portion 411 can be brought in the axial direction to connect with the upwardly opened annular end portion 441. The downwardly opened annular end portion 411 has a second inner annular wall with a second dimension.

The connector assembly includes a first stem member 43, a second stem member 45, and a tubular connecting member 42. The first stem member 43 has a first lower stem portion 43L with a first outer circumference of a third dimension which is slightly larger than the first dimension so that the first lower stem portion 43L will be adapted to engage firmly the first inner annular wall once the first lower stem portion 43L is inserted into the upwardly opened annular end portion 441 along the axial direction, and a first upper stem portion 43U with a first threaded outer circumference 432. The second stem member 45 has a second lower stem portion 45L with a second threaded outer circumference, and a second upper stem portion 45U with a second outer circumference of a fourth dimension which is slightly larger than the second dimension so that the second upper stem portion 45U will be adapted to engage firmly the second inner annular wall once the second upper stem portion 45U is inserted into the downwardly opened annular end portion 411 along the axial direction. The tubular connecting member 42 has an upper threaded inner circumferential wall 421 disposed to engage threadedly the second threaded outer circumference of the second lower stem portion 43L, and a lower threaded inner circumferential wall 422 disposed to engage threadedly the first threaded outer circumference 432 of the first upper stem portion 43U.

In the preferred embodiment, the first and second outer circumferences are embossed. Preferably, the first and second outer circumferences can be formed to correspond with upper and lower threaded inner circumferential walls 421, 422 while the lower and upper stem portions 43L, 45U of the first and second stem members 43, 45 can be of the same structure such that the first and second dimensions of the upwardly and downwardly open annular end portions 411, 441 of the upper and lower shafts 41, 44 can be constructed with the same dimensions.

With this invention thus explained, it is apparent that numerous modifications and variations can be made without departing from the scope and spirit of this invention. It is therefore intended that this invention be limited only as indicated in the appended claims.

What is claimed is:

1. An umbrella shaft comprising:

a lower shaft portion extending in an axial direction and adapted to be secured to a support, said lower shaft portion being provided with an upwardly opening annular end that has a first inner annular wall with a first dimension;

an upper shaft portion having an upper hollow shaft section adapted to carry a stretchable canopy and provided with a downwardly opening annular end to be brought in the axial direction to connect with the upwardly opening annular end, said downwardly opening annular end having a second inner annular wall with a second dimension; and a connector assembly including a first stem member having a first lower stem portion with a first outer circumference of a third dimension which is slightly larger than the first dimension so that said first lower stem portion will engage firmly said first inner annular wall once said first lower stem portion is inserted into said upwardly opening annular end along the axial direction, and a first upper stem portion with a first threaded outer circumference, a second stem member having a second lower stem portion with a second threaded outer circumference, and a second upper stem portion with a second outer circumference of a fourth dimension which is slightly larger than the second dimension so that said second upper stem portion will engage firmly said second inner annular wall once said upper stem portion is inserted into said downwardly opening annular end along the axial direction, and a tubular connecting member including an upper threaded inner circumferential wall to engage threadedly said second threaded outer circumference, and a lower threaded inner circumferential wall to engage threadedly said first threaded outer circumference.

2. The umbrella shaft as defined in claim 1, wherein said first and second outer circumferences are embossed.

* * * * *